US011979731B2

(12) United States Patent
Yang et al.

(10) Patent No.: US 11,979,731 B2
(45) **Date of Patent: *May 7, 2024**

(54) SOUND-PRODUCING DEVICE

(71) Applicant: GOERTEK INC., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 195 days.

This patent is subject to a terminal disclaimer.

(21) Appl. No.: 17/773,441

(22) PCT Filed: Nov. 5, 2020

(86) PCT No.: PCT/CN2020/126801

§ 371 (c)(1),
(2) Date: Apr. 29, 2022

(87) PCT Pub. No.: WO2021/088929

PCT Pub. Date: May 14, 2021

(65) Prior Publication Data

US 2022/0386034 A1 Dec. 1, 2022

(30) Foreign Application Priority Data

Nov. 8, 2019 (CN) ........................ 201911089625.9

(51) Int. Cl.
*H04R 25/00* (2006.01)
*H04R 9/04* (2006.01)
*H04R 9/06* (2006.01)

(52) U.S. Cl.
CPC ............... *H04R 9/06* (2013.01); *H04R 9/043* (2013.01); *H04R 2400/11* (2013.01)

(58) Field of Classification Search
CPC ...... H04R 2400/11; H04R 9/043; H04R 9/06; H04R 9/02; H04R 9/04
USPC .......................................................... 381/400
See application file for complete search history.

(56) References Cited

U.S. PATENT DOCUMENTS 5,757,945 A * 5/1998 Sakamoto ................ H04R 9/06 381/400
7,515,727 B2 * 4/2009 Watanabe ............ H04R 31/006 381/409
9,942,680 B1 * 4/2018 Little ................... H04R 31/006
10,863,257 B1 * 12/2020 Pierce ...................... H04R 1/06
2005/0111689 A1 * 5/2005 True ..................... H04R 31/006 381/423

(Continued)

*Primary Examiner* — Phylesha Dabney
(74) *Attorney, Agent, or Firm* — Baker Botts, LLP

(57) ABSTRACT

Disclosed is a sound-producing device, including: a voice coil configured to be able to be input an electrical signal; and a damper including a first connecting part, a planar elastic part and a second connecting part. The first connecting part is configured to be connected to the voice coil; the second connecting part is configured to be fixed to the sound-producing device; the planar elastic part is formed by the first connecting part being bent and extending toward the second connecting part; the damper has a mechanical stiffness Kms of 0.2 N/mm to 2 N/mm; the sound-producing device has a resonance frequency F0 of 50 Hz to 300 Hz; the sound-producing device has a total harmonic distortion THD of less than 10% in a frequency range of 100 Hz to 300 Hz.

18 Claims, 5 Drawing Sheets

(56) References Cited

U.S. PATENT DOCUMENTS

| | | | | |
|---|---|---|---|---|
| 2017/0339478 | A1* | 11/2017 | Xiao | H04R 9/025 |
| 2019/0149924 | A1* | 5/2019 | Cheng | H04R 9/025 381/412 |
| 2022/0377465 | A1* | 11/2022 | Yang | H04R 9/046 |
| 2022/0408192 | A1* | 12/2022 | Yang | H04R 9/043 |
| 2022/0417664 | A1* | 12/2022 | Hsu | H05K 1/0277 |
| 2023/0199393 | A1* | 6/2023 | Chen | H04R 9/045 381/430 |
| 2023/0232157 | A1* | 7/2023 | Liu | H04R 9/043 381/400 |

* cited by examiner b: A Sound-producing Device Installed with a Prior Art Damper: Resonant Frequency F0 =195Hz
c: A Sound-producing Device Installed with the Damper of the Present Disclosure: Resonant Frequency F0=170Hz b: A Sound-producing Device Installed with a Prior Art Damper
c: A Sound-producing Device Installed with the Damper of the Present Disclosure

| Degree of the Acute Angle | Kms (N/mm) | Variation % (2mm) |
|---|---|---|
| 15° | 1.02 | 23.5% |
| 25° | 0.565 | 7% |
| 35° | 0.325 | 2% |

| Number of Bending Tracks/ Interval | Kms（N/mm） | Variation %（2mm） |
|---|---|---|
| 8 tracks/ 0.4mm | 0.473 | 5% |
| 6 tracks/ 0.6mm | 0.565 | 7% |
| 4 tracks/ 1.1mm | 0.683 | 8.7% |

| Wire Diameter of Metal Wire | Kms（N/mm） | Variation %（2mm） |
|---|---|---|
| 0.3mm | 0.565 | 7% |
| 0.33mm | 0.81 | 6.1% |
| 0.35mm | 1.01 | 6.1% |

SOUND-PRODUCING DEVICE

CROSS-REFERENCE TO RELATED APPLICATIONS

This application is a National Stage of International Application No. PCT/CN2020/126801, filed on Nov. 5, 2020, which claims priority to Chinese Patent Application No. 201911089625.9, filed on Nov. 8, 2019, both of which are hereby incorporated by reference in their entireties.

TECHNICAL FIELD

The present disclosure relates to the technical field of electro-acoustic devices, and particularly to a sound-producing device.

BACKGROUND

A speaker is a basic sound-producing unit that converts electrical signals into acoustic signals. A damper is a component in a speaker that adjusts vibration direction of a vibrating diaphragm thereof, and restrains polarization of the vibrating diaphragm by mechanical restoring force. Performance of a damper greatly influences acoustic performance and service life of a speaker.

A traditional damper is of an annular shape. An annular damper is provided as a corrugated structure along its radial direction. A damper is usually made of materials such as CONEX, blended fabric, cloth, etc. Limited by the above material types, it is difficult for a prior art damper to make its Kms very small. Since Kms and Cms of a sound-producing device are reciprocal to each other, the compliance Cms of the damper will degrade if the vibration amplitude thereof is large. This results in a relatively high resonance frequency F0 of the speaker. Since F0 is an important factor influencing acoustic performance of the speaker, a high F0 will result in degraded bass sensitivity of the speaker product. At the same time, a speaker using the traditional damper has a relatively high total harmonic distortion (THD), which degrades acoustic performance of the speaker and greatly influences user experience.

Moreover, hardness of the damper increases in a high-temperature and humid environment since material of the damper is usually chemical fiber, blended fabric, etc. As such, the damper is prone to be deformed or even broken, and thus its fatigue performance also degrades. Service life of the speaker will also be significantly shortened, because failure of the damper will directly cause failure of the speaker.

Therefore, it is necessary to improve the damper to solve the problem of poor acoustic performance and short service life of prior art speakers.

SUMMARY

The present disclosure aims to provide a sound-producing device, which can improve acoustic performance of existing sound-producing devices and prolong service lives thereof.

A sound-producing device, including:

a voice coil configured to be able to be input an electrical signal; and a damper including a first connecting part, a planar elastic part and a second connecting part; wherein the first connecting part is configured to be connected to the voice coil;

the second connecting part is configured to be fixed to the sound-producing device;

the planar elastic part is formed by the first connecting part being bent and extending toward the second connecting part;

the damper has a mechanical stiffness Kms of 0.2 N/mm to 2 N/mm;

the sound-producing device has a resonance frequency F0 of 50 Hz to 300 Hz;

the sound-producing device has a total harmonic distortion THD of less than 10% in a frequency range of 100 Hz to 300 Hz.

Optionally, the sound-producing device has a total harmonic distortion THD of less than 2.5% at a frequency of 200 Hz.

Optionally, the sound-producing device has a total harmonic distortion THD of less than 2% at a frequency of 300 Hz.

Optionally, a width of the planar elastic part gradually increases along a direction from the first connecting part to the second connecting part, with extension lines of two sides of the planar elastic part in its width direction intersecting at a point in a direction in which the first connecting part faces away from the second connecting part and forming an acute angle.

Optionally, the acute angle is no less than 10°.

Optionally, the acute angle is greater than 20°.

Optionally, each bending of the planar elastic part constitutes a bending track; and a number of bending tracks is no less than 3.

Optionally, each bending of the planar elastic part constitutes a bending track; and an interval between two adjacent bending tracks is no greater than 1.5 mm.

Optionally, the damper is formed by winding a metal wire into a line-like shape, and an interval between two adjacent bending tracks is greater than a wire diameter of the metal wire.

Optionally, the wire diameter of the metal wire is 0.2 mm to 0.5 mm.

Optionally, the wire diameter of the metal wire is 0.3 mm to 0.4 mm.

Optionally, the damper includes two planar elastic parts which are formed by both ends of the first connecting part being bent and extending in an S shape respectively.

Optionally, the first connecting part is in the shape of an arc between the two planar elastic parts.

Optionally, the first connecting part is in the shape of a broken line between the two planar elastic parts.

Optionally, the second connecting part is of a hook structure.

Advantages of the technical solution of the present disclosure are: a sound-producing device with the abovementioned damper is using a damper that can achieve a smaller Kms. Comparing with the prior art, F0 of the device is made lower, thereby achieving good acoustic performance and effectively prolonging service life of the sound-producing device.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

Figure 1:
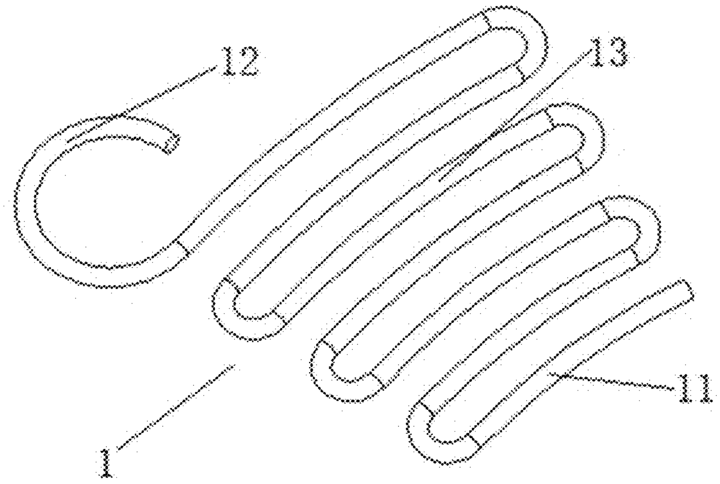
FIG. 1 is a schematic diagram of a damper of a sound-producing device according to an embodiment of the present disclosure.

Reference signs are as follows: 1—damper; 11—first connecting part; 12—second connecting part; 13—planar elastic part;

Note: two bending tracks constitute one corrugation.

DETAILED DESCRIPTION

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

A damper is a component installed in the speaker to adjust the vibration and center the voice coil at the same time. The performance of the damper has a great influence on the acoustic performance and service life of the speaker, such as the distortion and low frequency sensitivity of the speaker.

A traditional damper is of an annular shape, and is provided as a corrugated structure in the radial direction thereof. A damper is usually made of CONEX, blended fabrics, cloth and other materials. As such, when a voice coil is of large vibration amplitude, compliance Cms of the damper degrades. That is, mechanical stiffness Kms is large (Kms and Cms are reciprocal to each other) while compliance is poor in symmetry. This results in a relatively high resonance frequency F0 of the speaker. Since F0 is an important factor influencing acoustic performance of the speaker, a high F0 will result in degraded bass sensitivity of the speaker product. At the same time, a speaker using the traditional damper has a relatively high total harmonic distortion (THD), which degrades acoustic performance of the speaker and greatly influences user experience.

Moreover, hardness of the damper increases in a high-temperature and humid environment since material of the damper is usually chemical fiber, blended fabric, etc. As such, the damper is prone to be deformed or even broken, and thus its fatigue performance also degrades. Service life of the speaker will also be significantly shortened, because failure of the damper will directly cause failure of the speaker.

Therefore, in order to solve the above technical problems, the present disclosure provides improvements to existing dampers.

Figure 2:
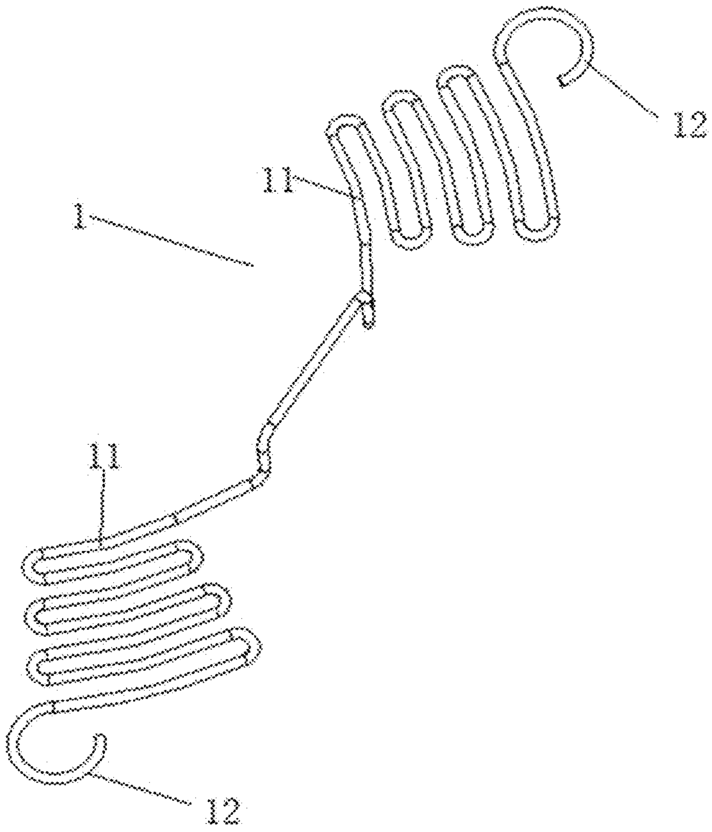
FIG. 2 is a schematic diagram of a damper of a sound-producing device according to an embodiment of the present disclosure.

A sound-producing device, as shown in FIGS. 1 and 2, includes: a voice coil configured to be able to be input an electrical signal; a damper as shown in FIG. 1, including a first connecting part 11, a planar elastic part 13 and a second connecting part 12; the first connecting part is configured to be connected to the voice coil; the second connecting part is configured to be fixed to the sound-producing device; the planar elastic part is formed by the first connecting part being bent and extending in an S shape toward the second connecting part; the damper has a mechanical stiffness Kms of 0.2 N/mm to 2 N/mm; the sound-producing device has a resonance frequency F0 of 50 Hz to 300 Hz; the sound-producing device has a total harmonic distortion THD of less than 10% in a frequency range of 100 Hz to 300 Hz.

The sound-producing device includes a damper, and in a preferred embodiment, the damper serves as a damper of the sound-producing device. One end of the damper is provided as a first connecting part. A voice coil is installed in the sound-producing device, and the first connecting part is connected to the voice coil of the sound-producing device. Optionally, the voice coil includes a voice coil body and a bobbin, both of which are tubular structures. The voice coil body is a coil wound on a bobbin, and the bobbin is used for supporting the voice coil body. The first connecting part of the damper can be connected to the bobbin, and can also be connected to the voice coil body. The other end of the damper is provided as a second connecting part, which is fixed on the sound-producing device. Optionally, the sound-producing device further includes a casing, and the second connection portion is fixed on the casing. The first connecting part is bent and extends toward the second connecting part to form a planar elastic part connected between the first connecting part and the second connecting part. Optionally, the planar elastic part may be a homocentric structure just like a spring, and has the ability to elastically deform. The damper is connected to the voice coil via the first connecting part, while the second connecting part is connected to the sound-producing device and installed in the sound-producing device. As a damper of the sound-producing device, it can adjust vibration of the sound-producing device, and at the same time functions to center the voice coil. When the planar elastic part is capable of elastic deformation, it has better polarization adjustment performance.

Optionally, the mechanical stiffness Kms of the damper is 0.2 N/mm to 2 N/mm. The mechanical stiffness Kms is the reciprocal of compliance, which reflects the compliance of the damper to the driving force. Kms is an important factor influencing the acoustic performance of the sound-producing device. The damper of the present disclosure has a mechanical stiffness Kms of 0.2 N/mm to 2 N/mm. Within this range of mechanical stiffness, the damper has good compliance with driving force, and refrains from plastic deformation and damage when the sound-producing device is vibrating with a large displacement. Therefore, when the mechanical stiffness of the damper is 0.2 N/mm to 2 N/mm, the sound-producing device can achieve better acoustic performance.

Optionally, the resonance frequency F0 of the sound-producing device is 50 Hz to 300 Hz; the resonance frequency F0 is an important parameter that influences the low-frequency performance of the sound-producing device, and its calculation formula is as follows:

$$F0=\frac{1}{2\pi}\sqrt{Kms/Mms}$$

Wherein: F0 is resonance frequency;

π is the circumference ratio pi;

Kms is mechanical stiffness;

Mms is equivalent mass.

It can be seen from the above formula that Kms and Mms are two factors that influence F0. The smaller Kms is, the smaller the resonance frequency F0 is, and the better the acoustic performance of the sound-producing device is. The larger Mms, the smaller the resonance frequency F0. Under the existing technical conditions, in order to achieve a small mechanical stiffness, it is bound to put forward higher demands on performance of the material, which will undoubtedly increase the manufacturing cost of the sound-producing device. On the other hand, if the resonance frequency F0 is reduced by increasing the equivalent mass of the sound-producing device, it not only violates the principle of light weight of the product, but also adversely influences other performances of the sound-producing device. Therefore, in the present disclosure, by limiting the resonance frequency F0 within the range of 50 Hz to 300 Hz, the sound-producing device can achieve good low-frequency acoustic performance, while balancing the relationship between the low-frequency acoustic performance on one hand and the product manufacturing cost and other properties of the sound-producing device on the other hand.

Figure 3:
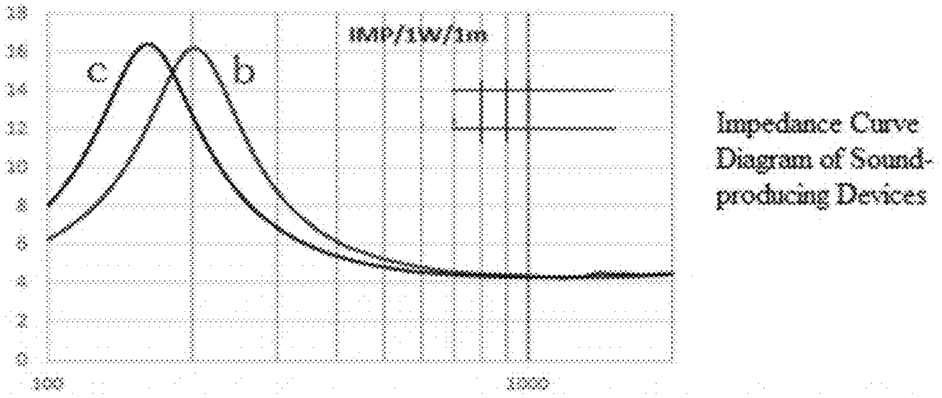
FIG. 3 is an impedance curve diagram of a sound-producing device damper according to an embodiment of the present disclosure and a sound-producing device using a traditional damper.

According to an embodiment of the present disclosure, the impedances of the existing damper (curve b) and the sound-producing device using the above-mentioned damper (curve c) are measured, and the measured results are shown in FIG. 3. As can be seen from the figure, for the traditional damper, the measured resonance frequency F0 of the sound-producing device is about 195 Hz. On the other hand, when the traditional damper is replaced with the above-mentioned damper, the measured resonance frequency F0 of the sound-producing device is about 170 Hz. It can be seen from the test results that, using the damper as a damper of the sound-producing device can significantly reduce the resonance frequency F0 of the sound-producing device, improve the bass sensitivity, and improve the acoustic performance of the sound-producing device.

Figure 4:
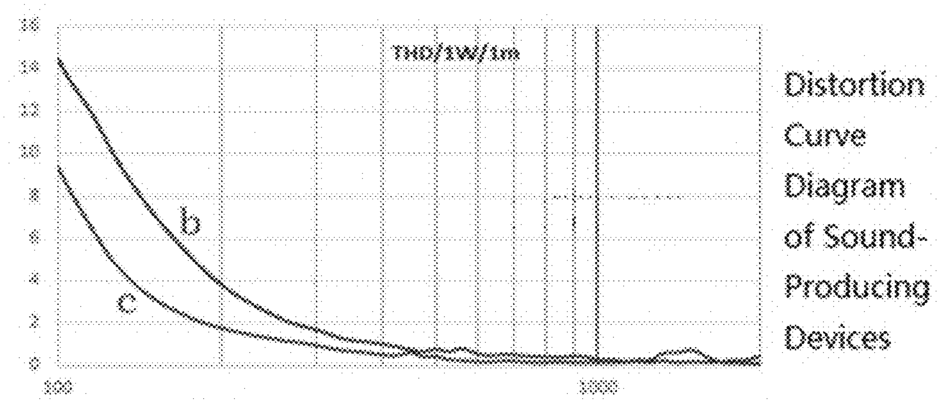
FIG. 4 is a distortion curve diagram of a sound-producing device damper according to an embodiment of the present disclosure and a sound-producing device using a traditional damper.

Total Harmonic Distortion (THD) is a parameter that reflects the degree of sound reproduction of a sound-producing device. The larger THD value is, the more serious the sound distortion of the sound-producing device is, and the worse the listening effect of the sound-producing device is. Therefore, in order to achieve a good sense of hearing, the sound-producing device is required to have a small total harmonic distortion THD. According to an embodiment of the present disclosure, the total harmonic distortion THD of an existing damper (curve b) and a sound-producing device using the above-mentioned damper (curve c) is measured, and the results are shown in FIG. 4. As can be seen from the figure, at a frequency of lower than 1000 Hz, the measured total harmonic distortion THD of the sound-producing device with the traditional damper is significantly higher than that of the sound-producing device with the above-mentioned damper. Moreover, the lower the frequency, the greater the difference between the two, and the more obvious the improvement effect on the total harmonic distortion THD of the sound-producing device. Therefore, using the damper of the present disclosure as the damper of the sound-producing device can significantly improve the sound reproducibility and the listening effect of the sound-producing device.

Optionally, in the frequency range of 100 Hz to 300 Hz, the total harmonic distortion THD of the sound-producing device is less than 10%. In the above frequency range, limiting the total harmonic distortion THD of the sound-producing device to less than 10% can ensure a small sound distortion of the sound-producing device, thereby enabling the user to enjoy a better listening effect. Preferably, at a frequency of 200 Hz, the total harmonic distortion THD of the sound-producing device is limited to less than 2.5%. Preferably, at a frequency of 300 Hz, the total harmonic distortion THD of the sound-producing device is limited to less than 2%.

Optionally, a width of the planar elastic part gradually increases along a direction from the first connecting part to the second connecting part, with extension lines of two sides of the planar elastic part in its width direction intersecting at a point in a direction in which the first connecting part faces away from the second connecting part and forming an acute angle. In one embodiment, the acute angle is no less than 10°. Further, in a preferred embodiment, the acute angle is greater than 20°.

Figures 5, 6:
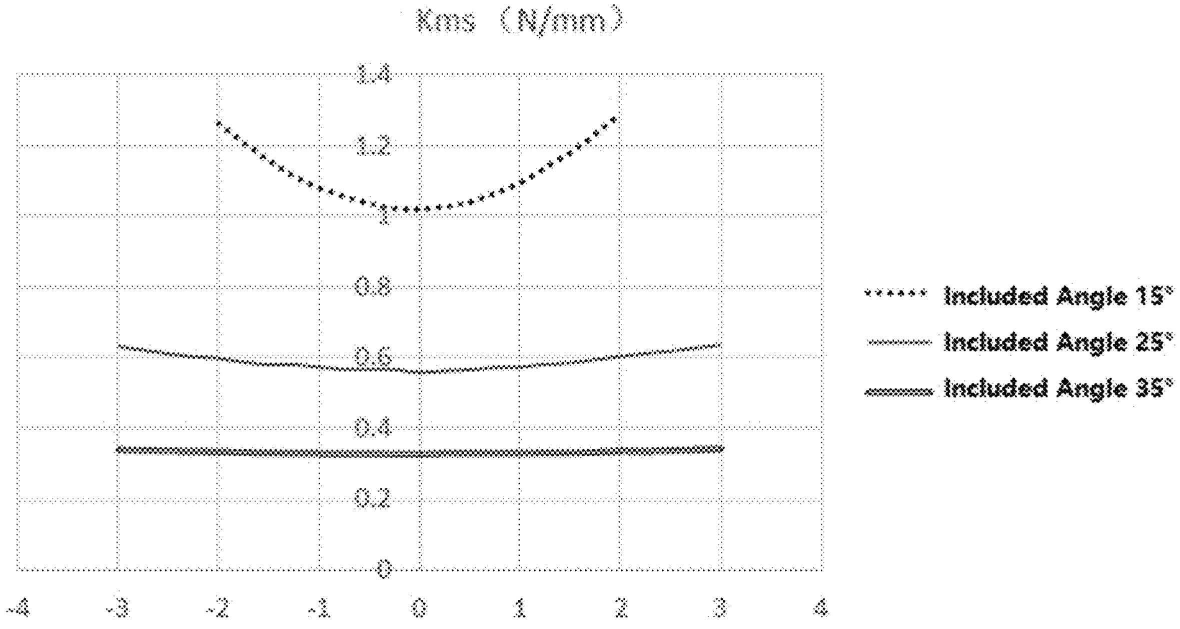
FIG. 5 is a measurement value diagram of the mechanical stiffness of the dampers with different acute angles according to an embodiment of the present disclosure.
FIG. 6 is an analysis diagram of the mechanical stiffness of dampers with different acute angles according to an embodiment of the present disclosure.

It is found from actual testing that the acute angle formed upon extension and intersection of the two side edges of the planar elastic part will influence the mechanical stiffness of the damper. FIG. 5 shows the mechanical stiffness Kms of the corresponding dampers under different angles of an embodiment of the present disclosure. When the acute angle is 15°, the measured mechanical stiffness of the damper is 1.02 N/mm, and the elastic force variation of the damper is 23.5% when an elastic deformation of 2 mm occurs to the planar elastic part. When the acute angle is increased to 25°, the measured mechanical stiffness of the damper is 0.565 N/mm, and the elastic force variation of the damper is 7% when an elastic deformation of 2 mm occurs to the planar elastic part. When the acute angle is further increased to 35°, the measured mechanical stiffness of the damper is 0.325 N/mm, and the elastic force variation of the damper is 2% when an elastic deformation of 2 mm occurs to the planar elastic part. It can be seen from FIG. 6 that, in the case that the other parameters remaining the same, the larger the acute angle, the lower the value of the mechanical stiffness Kms, the better the linear performance of the damper. With the increasing of the acute angle, the mechanical stiffness of the damper reduces significantly, and correspondingly, the resonance frequency F0 of the sound-producing device using the abovementioned damper as its damper also decreases. In this way, the sound-producing device can achieve higher bass sensitivity, which helps to improve acoustic performance of the sound-producing device.

Optionally, each bending of the planar elastic part constitutes a bending track, and a number of bending tracks is no less than 3. In this design, the effective amount of deformation of the damper can satisfy the use demands on the sound-producing device. This enables the sound-producing device to achieve good acoustic performance, with its service life satisfying the design demands. Of course, the user can adjust the effective number of turns of the damper according to actual needs, which is not specifically limited in the present disclosure. In one embodiment, each bending of the planar elastic part constitutes a bending track, and the interval between two adjacent bending tracks is no more than 1.5 mm. In a preferred embodiment, every two adjacent bending tracks are equally spaced.

Figures 7, 8:
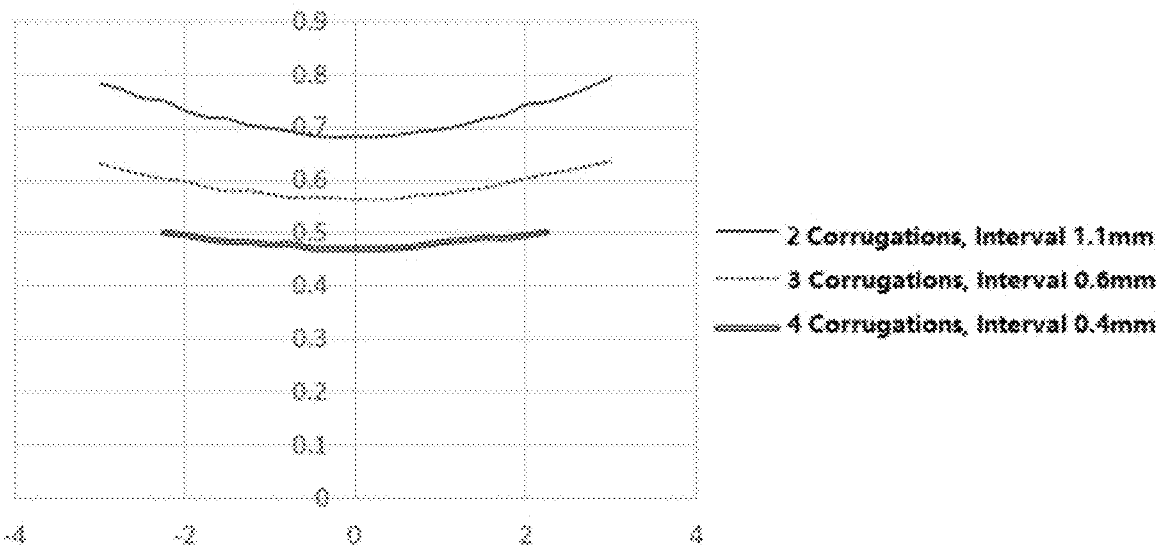
FIG. 7 is a measurement value diagram of mechanical stiffness of dampers with different wire diameters and the number of bending tracks according to an embodiment of the present disclosure.
FIG. 8 is an analysis diagram of mechanical stiffness of dampers with different wire diameters and the number of bending tracks according to an embodiment of the present disclosure.

FIG. 7 shows the mechanical stiffness values of the dampers with different bending tracks and intervals. It can be seen from the figure that: when the planar elastic part is bent 8 times to form 8 bending tracks, where every two adjacent bending tracks are equally spaced at an interval of 0.4 mm, the mechanical stiffness Kms value of the damper is 0.473 N/mm, and the elastic force variation of the planar elastic part of the damper is 5% when the elastic deformation of 2 mm occurs; when the planar elastic part is bent 6 times to form 6 bending tracks, where every two adjacent bending tracks are equally spaced at an interval of 0.6 mm, the mechanical stiffness Kms value of the damper is 0.565 N/mm, and the elastic force variation of the planar elastic part of the damper is 7% when the elastic deformation of 2 mm occurs; when the planar elastic part is bent 4 times to form 4 bending tracks, where every two adjacent bending tracks are equally spaced at an interval of 1.1 mm, the mechanical stiffness Kms value of the damper is 0.683 N/mm, and the elastic force variation of the planar elastic part of the damper is 8.7% when the elastic deformation of 2 mm occurs.

As shown in FIG. 8, in the case that the other parameters remain the same, with the increasing of number of bending tracks in the planar elastic part, (that is, increasing number of bending), the mechanical stiffness Kms of the damper reduces, and the linear performance of the damper is better. In addition, with the reducing of the interval between the two adjacent bending tracks (that is, the bending tracks become denser), the mechanical stiffness Kms of the damper reduces, and the linear performance of the damper is better.

In one embodiment, an interval between two adjacent bending tracks is greater than a wire diameter of the metal wire of the damper. In one embodiment, the wire diameter of the metal wire of the damper is 0.2 mm to 0.5 mm. In a more preferred embodiment, the wire diameter of the metal wire of the damper is 0.3 mm to 0.4 mm.

Figures 9, 10:
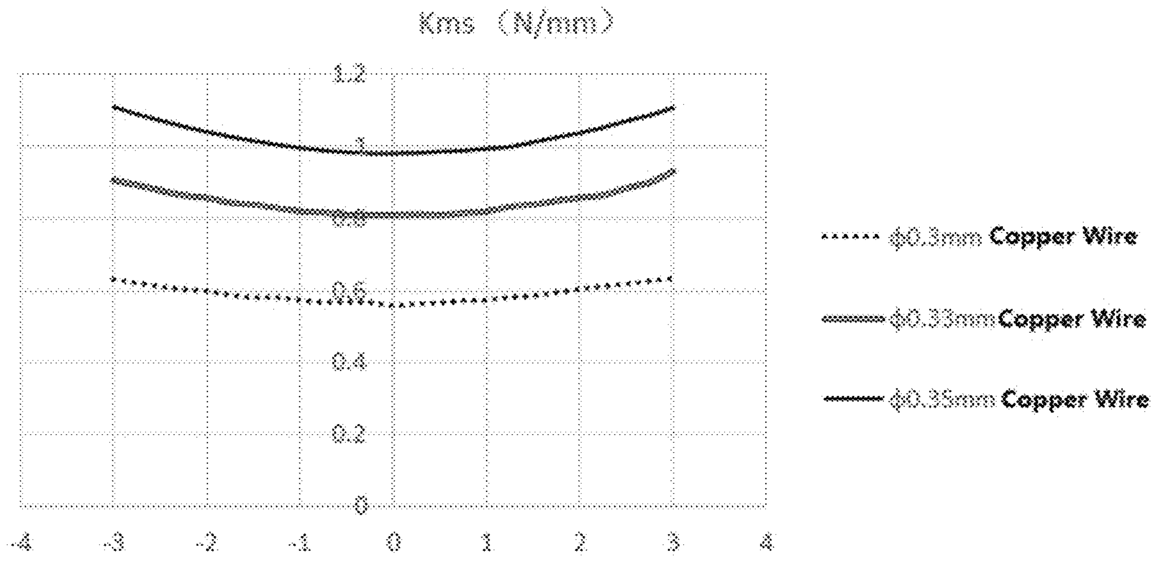
FIG. 9 is a measurement value diagram showing measurement values of the mechanical stiffness of the dampers with different metal wire diameters according to an embodiment of the present disclosure.
FIG. 10 is an analysis diagram of mechanical stiffness of dampers with different metal wire diameters according to an embodiment of the present disclosure.

FIG. 9 shows mechanical stiffness values of the damper under different wire diameters. It can be seen from FIG. 9 that, when the wire diameter of the metal wire is 0.3 mm, the mechanical stiffness Kms value of the damper made of the metal wire is 0.565 N/mm, and the planar elastic part of the damper shows a 7% elastic force variation when an elastic deformation of 2 mm is occurring; when the wire diameter of the metal wire is 0.33 mm, the mechanical stiffness Kms value of the damper made of the metal wire is 0.81 N/mm, and the planar elastic part of the damper shows a 6.1% elastic force variation when an elastic deformation of 2 mm is occurring; when the wire diameter of the metal wire is 0.35 mm, the mechanical stiffness Kms value of the damper made of the metal wire is 1.01 N/mm, and the planar elastic part of the damper shows a 6.1% elastic force variation when an elastic deformation of 2 mm is occurring.

As shown in FIG. 10, the wire diameter of the metal wire constituting the damper has a very significant influence on the mechanical stiffness of the damper. In the case that the other parameters remain the same, an increased wire diameter causes the corresponding mechanical stiffness Kms to increase, thereby degrading the linear performance of the damper. However, variation of the linear performance is not significant. Considering the overall strength of the damper, a too small wire diameter of the metal wire is not a choice, as a damper made of metal wire with a too small wire diameter cannot satisfy the demands on strength. Therefore, when the wire diameter of the metal wire of the damper is set to 0.3 mm to 0.4 mm, its mechanical stiffness and linear performance are guaranteed while satisfying the strength demands of the damper.

In one embodiment, the first connecting part, the planar elastic part and the second connecting part are integrally formed. That is, the entire damper is wound by a metal wire and formed into a line-like shape. This forming approach is convenient for operation and processing in terms of technology. At the same time, by reasonably selecting the type of metal material and adjusting the performance of the damper, a damper with good compliance and high fatigue strength can be obtained, enabling the sound-producing device to achieve a smaller resonance frequency F0 and a longer service life. In addition, the metal material has good temperature resistance and humidity resistance, and the damper made thereof may be used in extreme environments such as high temperature and high humidity with little impact on the acoustic performance and service life of the sound-producing device. In addition, a damper made of metal material can be used to replace the lead wire in the sound-producing device, for inputting electrical signals to the voice coil body. On one hand, this arrangement can reduce production cost of the sound-producing device; on the other hand, it can solve the compliance problem of the lead wire under the trend of miniaturization of the existing sound-producing device, and alleviate the problem of poor hearing caused by the compliance of the lead wire, thereby enabling the sound-producing device products to reduce their height.

In one embodiment, as shown in FIG. 1, there is provided one planar elastic part, which is formed by one end of the first connecting part being bent and extending in an S shape. In this embodiment, the length of the first connecting part is substantially consistent with the minimum width of the planar elastic part, and the size of the entire damper is relatively small.

Optionally, as shown in FIG. 2, there are provided two planar elastic parts which are formed by both ends of the first connecting part being bent and extending in an S shape respectively. In this embodiment, the first connecting part connects the two planar elastic parts, with the two planar elastic parts being symmetrically distributed at two ends of the first connecting part.

Optionally, the first connecting part is in the shape of an arc between the two planar elastic parts.

Optionally, the first connecting part is in the shape of a broken line between the two planar elastic parts. In this embodiment, the zigzag shape of the broken line forms an outwardly convex structure along the height direction of the voice coil. During use, the convex structure is attached to the periphery of the voice coil to function as a firm support for the voice coil.

Optionally, as shown in FIG. 1 and FIG. 2, the second connecting part is formed in a hook structure. As an embodiment of the present disclosure, the sound-producing device is provided with a hanger column therein. In use, the damper is fixed on the hanger column via the hook structure. Implementing the connection between the conductive member and the sound-producing device in this way may simplify the installation process of the conductive member. Alternatively, the sound-producing device is provided with a hanging loop therein, and the hook structure may also be hooked on the hanging loop in the sound-producing device, which is not limited in the present disclosure. Optionally, the number of bending turns of the hook structure may be one turn or at least two turns, and when the number of bending turns of the hook structure is at least two turns, the at least two turns of hook structures have overlapped orthographic projections in the vertical direction. Increasing the number of bending turns of the hook structure is beneficial to stably fixing the conductive member on the sound-producing device.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our invention all that comes within the scope of the appended claims.

The invention claimed is:

1. A sound-producing device, comprising:

a voice coil configured to input an electrical signal; and a damper including a first connecting part, a planar elastic part and a second connecting part; wherein the first connecting part is configured to connect to the voice coil;

the second connecting part is configured to fix to the sound-producing device;

the planar elastic part comprises a bent portion of the first connecting part extending toward the second connecting part;

the damper has a mechanical stiffness Kms of 0.2 N/mm to 2 N/mm;

the sound-producing device has a resonance frequency F0 of 50 Hz to 300 Hz; and the sound-producing device has a total harmonic distortion THD of less than 10% in a frequency range of 100 Hz to 300 Hz.

2. The sound-producing device of claim 1, wherein the sound-producing device has a total harmonic distortion THD of less than 2.5% at a frequency of 200 Hz.

3. The sound-producing device of claim 1, wherein the sound-producing device has a total harmonic distortion THD of less than 2% at a frequency of 300 Hz.

4. The sound-producing device of claim 1, wherein a width of the planar elastic part increases along a direction from the first connecting part to the second connecting part, with extension lines of two sides of the planar elastic part in its width direction intersecting at a point in a direction in which the first connecting part faces away from the second connecting part and forming an acute angle.

5. The sound-producing device of claim 4, wherein the acute angle is no less than 10°.

6. The sound-producing device of claim 5, wherein the acute angle is greater than 20°.

7. The sound-producing device of claim 1, wherein the bent portion comprises three or more bends, each forming a bending track.

8. The sound-producing device of claim 7, wherein the damper comprises a metal wire wound into a line-like shape, and wherein an interval between two of the two or more bending tracks that are adjacent is greater than a wire diameter of the metal wire.

9. The sound-producing device of claim 8, wherein the wire diameter of the metal wire is 0.2 mm to 0.5 mm.

10. The sound-producing device of claim 9, wherein the wire diameter of the metal wire is 0.3 mm to 0.4 mm.

11. The sound-producing device of claim 1, wherein the bent portion comprises two or more bends, each forming a bending track; and wherein an interval between two of the two or more bending tracks that are adjacent is no greater than 1.5 mm.

12. The sound-producing device of claim 11, wherein the damper is formed by winding a metal wire into a line-like shape, and an interval between two adjacent bending tracks is greater than a wire diameter of the metal wire.

13. The sound-producing device of claim 12, wherein the wire diameter of the metal wire is 0.2 mm to 0.5 mm.

14. The sound-producing device of claim 13, wherein the wire diameter of the metal wire is 0.3 mm to 0.4 mm.

15. The sound-producing device of claim 1, wherein the damper comprises two planar elastic parts, each comprising a bent end of the first connecting part extending in an S shape.

16. The sound-producing device of claim 15, wherein the first connecting part is in the shape of an arc between the two planar elastic parts.

17. The sound-producing device of claim 15, wherein the first connecting part is in the shape of a broken line between the two planar elastic parts.

18. The sound-producing device of claim 1, wherein the second connecting part is of a hook structure.

* * * * *